United States Patent
Masuda et al.

(10) Patent No.: US 11,965,801 B2
(45) Date of Patent: Apr. 23, 2024

(54) MEASUREMENT SYSTEM

(71) Applicants: SUMITOMO ELECTRIC OPTIFRONTIER CO., LTD., Yokohama (JP); SUMITOMO ELECTRIC INDUSTRIES, LTD., Osaka (JP)

(72) Inventors: Kazuya Masuda, Osaka (JP); Tomohiko Ueda, Osaka (JP); Kenichiro Otsuka, Osaka (JP); Tsuneari Ito, Osaka (JP); Tetsufumi Tsuzaki, Yokohama (JP); Yoshifumi Hishikawa, Yokohama (JP); Hitoshi Hatayama, Yokohama (JP)

(73) Assignees: SUMITOMO ELECTRIC OPTIFRONTIER CO., LTD., Yokohama (JP); SUMITOMO ELECTRIC INDUSTRIES, LTD., Osaka (JP)

(*) Notice: Subject to any disclaimer, the term of this patent is extended or adjusted under 35 U.S.C. 154(b) by 708 days.

(21) Appl. No.: 17/053,556

(22) PCT Filed: May 22, 2019

(86) PCT No.: PCT/JP2019/020319
§ 371 (c)(1),
(2) Date: Nov. 6, 2020

(87) PCT Pub. No.: WO2019/235224
PCT Pub. Date: Dec. 12, 2019

(65) Prior Publication Data
US 2021/0239569 A1    Aug. 5, 2021

(30) Foreign Application Priority Data

Jun. 4, 2018 (JP) .................................. 2018-106912

(51) Int. Cl.
*G01M 11/00* (2006.01)
*G02B 6/35* (2006.01)
*G02B 6/42* (2006.01)

(52) U.S. Cl.
CPC ............. *G01M 11/33* (2013.01); *G02B 6/354* (2013.01); *G02B 6/4292* (2013.01)

(58) Field of Classification Search
CPC ....... G01M 11/33; G01M 11/31; G02B 6/354; G02B 6/4292; H04B 10/071; H04B 10/073
See application file for complete search history.

(56) References Cited

U.S. PATENT DOCUMENTS 5,093,568 A * 3/1992 Maycock ............. H04B 10/071
356/73.1
5,412,464 A   5/1995 Thomas et al.
(Continued)

FOREIGN PATENT DOCUMENTS

JP    S59-074509 A    4/1984
JP    H05-506099 A    9/1993
(Continued)

OTHER PUBLICATIONS

Dec. 8, 2020 International Preliminary Report on Patentability issued in International Patent Application No. PCT/JP2019/020319.
(Continued)

*Primary Examiner* — Mohamed K Amara
(74) *Attorney, Agent, or Firm* — Oliff PLC

(57) ABSTRACT

A measurement system includes a measurement device including a light source, and a first power meter, and one or a plurality of connection members each configured to optically connect a pair of optical fiber lines of the plurality of optical fiber lines. A first optical fiber line of the pair of optical fiber lines includes a first end and a second end, a
(Continued)

second optical fiber line of the pair of optical fiber lines includes a third end and a fourth end, the one or plurality of connection members optically connect the second end to the fourth end, the light source causes testing light to be incident on the first end, and the first power meter measures first intensity of first output light output from the third end by causing the testing light to propagate through the pair of optical fiber lines.

8 Claims, 8 Drawing Sheets

(56) References Cited

U.S. PATENT DOCUMENTS

| | | | | |
|---|---|---|---|---|
| 5,995,687 | A * | 11/1999 | White | G01M 11/3136 385/24 |
| 6,269,204 | B1 * | 7/2001 | Ishikawa | H04J 14/0282 385/24 |
| 6,317,535 | B1 * | 11/2001 | Jennings | H04B 10/071 385/24 |
| 6,366,724 | B1 * | 4/2002 | Jennings | H04B 10/00 372/38.1 |
| 6,522,434 | B1 | 2/2003 | Jennings et al. | |
| 6,547,453 | B1 * | 4/2003 | Stummer | H04B 10/071 385/24 |
| 6,583,867 | B1 | 6/2003 | Jennings et al. | |
| 7,848,645 | B2 * | 12/2010 | Healey | H04B 10/85 398/16 |
| 9,419,707 | B2 * | 8/2016 | Daems | H04B 10/071 |
| 9,435,713 | B2 * | 9/2016 | Collier | H04B 10/071 |
| 10,411,796 | B1 * | 9/2019 | Archambault | H04B 10/27 |
| 10,508,972 | B2 * | 12/2019 | Lönne | G01M 11/088 |
| 10,523,317 | B2 * | 12/2019 | Masuda | G01M 11/39 |
| 10,771,151 | B2 * | 9/2020 | Drake | G02B 6/4467 |
| 11,650,128 | B2 * | 5/2023 | Leclerc | G01M 11/3127 356/73.1 |
| 2006/0153491 | A1 * | 7/2006 | Murphy | H04L 63/1416 385/11 |
| 2007/0025676 | A1 * | 2/2007 | Russell | H04B 10/071 385/100 |
| 2009/0297140 | A1 * | 12/2009 | Heismann | G01M 11/335 398/16 |
| 2011/0153544 | A1 | 6/2011 | Nagel et al. | |
| 2013/0194566 | A1 * | 8/2013 | Schell | G02B 6/4292 356/73.1 |
| 2013/0301036 | A1 * | 11/2013 | Schillab | H04B 10/073 356/73.1 |
| 2014/0077971 | A1 * | 3/2014 | Archambault | H01S 3/302 340/870.04 |
| 2014/0078506 | A1 * | 3/2014 | Hu | G01M 11/3118 356/445 |
| 2016/0041065 | A1 | 2/2016 | L'Heureux et al. | |
| 2016/0349145 | A1 | 12/2016 | Irving | |
| 2017/0356805 | A1 | 12/2017 | Pei et al. | |
| 2018/0294873 | A1 * | 10/2018 | Martin | H04B 10/07955 |
| 2019/0372665 | A1 * | 12/2019 | Masuda | G01M 11/3136 |
| 2020/0386653 | A1 * | 12/2020 | Perron | G01M 11/3154 |
| 2022/0236141 | A1 * | 7/2022 | Fukumoto | H04B 10/0731 |
| 2023/0084406 | A1 * | 3/2023 | Faraj | G01M 11/3136 356/73.1 |

FOREIGN PATENT DOCUMENTS

| | | | |
|---|---|---|---|
| JP | H6-160197 | A | 6/1994 |
| JP | H10-336106 | A | 12/1998 |
| JP | 2000-295185 | A | 10/2000 |
| JP | 2003-222573 | A | 8/2003 |
| JP | 2005-326223 | A | 11/2005 |
| JP | 2006-139195 | A | 6/2006 |
| JP | 2008-232849 | A | 10/2008 |
| JP | 6196124 | B2 * | 9/2017 ............ G01M 11/00 |
| WO | 91/015744 | A1 | 10/1991 |

OTHER PUBLICATIONS

Feb. 14, 2022 Extended European Search Report issued in European Patent Application No. 19814558.3.

Fauve D, "Mesures Statiques Et Dynamiques Des Signaux Dans Les Reseaux Locaux En Fibres Optiques", Revue Generale De L'electricite, Rge. Paris, FR, No. 9, Oct. 1, 1991, p. 19-p. 27, XP000264278.

Aug. 6, 2019 International Search Report issued in International Patent Application No. PCT/JP2019/020319.

* cited by examiner

MEASUREMENT SYSTEM

TECHNICAL FIELD

The present disclosure relates to a measurement system. The present application claims priority based upon Japanese Patent Application No. 2018-106912, filed on Jun. 4, 2018; the entire contents disclosed in the aforementioned Japanese patent application being incorporated herein by reference.

BACKGROUND ART

Conventionally, a system that inspects an optical cable laid between two points has been known. For example, Patent Literature 1 and Patent Literature 2 disclose a measurement device for inspecting an optical fiber by an optical time domain reflectometer (OTDR) method for causing an optical pulse to be incident on one end of the optical fiber and measuring light returned to the one end by backscattering and reflection.

CITATION LIST

Patent Literature

Patent Literature 1: Japanese Unexamined Patent Publication No. H10-336106
Patent Literature 2: Japanese Unexamined Patent Publication No. 2000-295185

SUMMARY OF INVENTION

Technical Problem

In recent years, as a communication traffic increases, the number of optical fibers laid between two points increases, and the introduction of multicore optical cables has been advanced. When such an inspection of the optical cable is performed by using the devices described in Patent Literature 1 and Patent Literature 2, it is necessary to inspect the optical fibers included in the optical cable one by one, and a lot of time is required in the inspection.

The present disclosure provides a measurement system capable of improving inspection efficiency of an optical transmission line.

Solution to Problem

A measurement system according to one aspect of the present disclosure is a system that inspects an optical transmission line including a plurality of optical fiber lines. The measurement system includes a measurement device that includes a light source which outputs testing light, and a first power meter which measures intensity of light, and one or a plurality of connection members that each optically connects a pair of optical fiber lines of the plurality of optical fiber lines. A first optical fiber line of the pair of optical fiber lines includes a first end and a second end opposite to the first end. A second optical fiber line of the pair of optical fiber lines includes a third end and a fourth end opposite to the third end. The one or plurality of connection members optically connect the second end to the fourth end. The light source causes the testing light to be incident on the first end. The first power meter measures first intensity which is intensity of first output light output from the third end by causing the testing light to propagate through the pair of optical fiber lines.

Advantageous Effects of Invention

According to the present disclosure, the inspection efficiency of the optical transmission line can be improved.

DESCRIPTION OF EMBODIMENTS

Description of Embodiments of Present Disclosure

Figure 1:
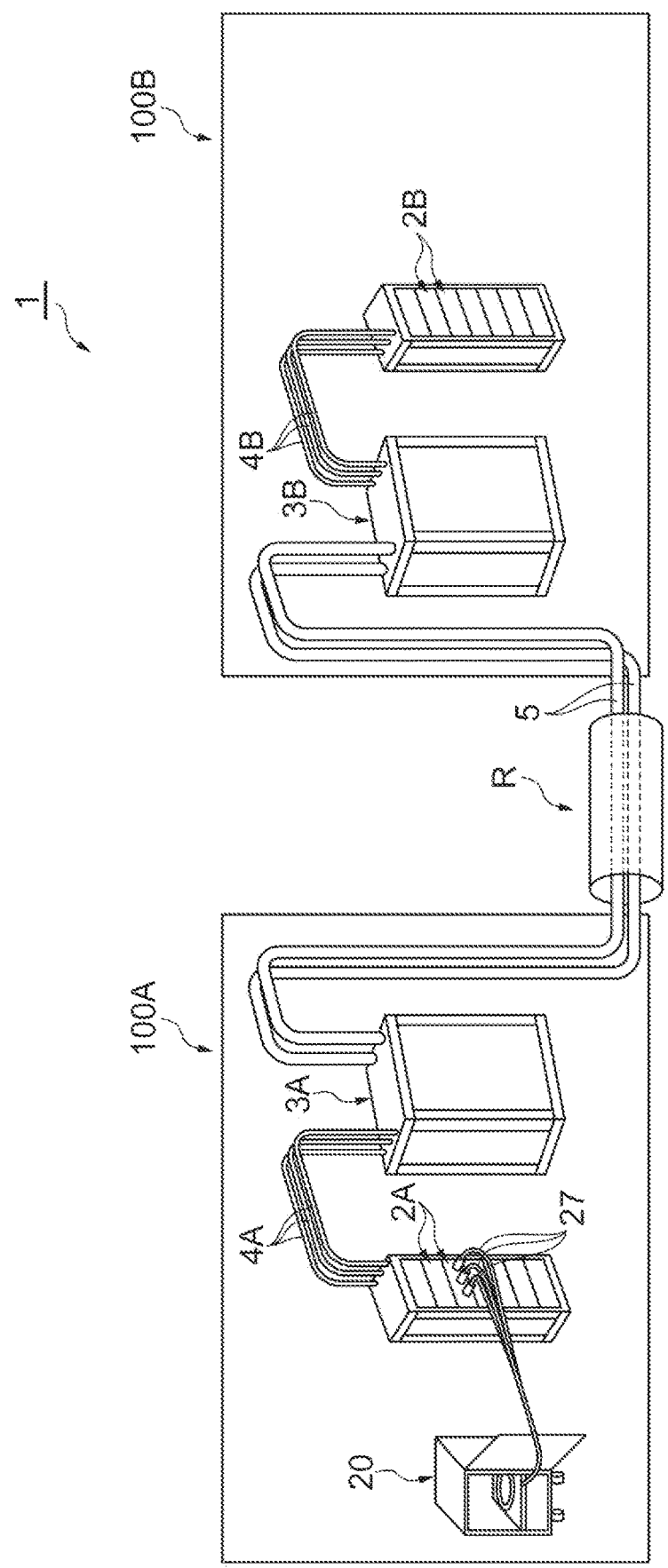
FIG. 1 is a schematic configuration diagram of an optical transmission system to be inspected by a measurement system according to a first embodiment.

First, the contents of embodiments of the present disclosure will be listed and described.

A measurement system according to one aspect of the present disclosure is a system that inspects an optical transmission line including a plurality of optical fiber lines. The measurement system includes a measurement device that includes a light source which outputs testing light, and a first power meter which measures intensity of light, and one or a plurality of connection members that each optically connects a pair of optical fiber lines of the plurality of optical fiber lines. A first optical fiber line of the pair of optical fiber lines includes a first end and a second end opposite to the first end. A second optical fiber line of the pair of optical fiber lines includes a third end and a fourth end opposite to the third end. The one or plurality of connection members optically connect the second end to the fourth end. The light source causes the testing light to be incident on the first end. The first power meter measures first intensity which is intensity of first output light output from the third end by causing the testing light to propagate through the pair of optical fiber lines.

In this measurement system, the second end of the first optical fiber line and the fourth end of the second optical fiber line are optically connected by the connection member, and the testing light is incident on the first end of the first optical fiber line. Thus, the testing light passes through the first optical fiber line, the connection member, and the second optical fiber line in this order, and is output as the first output light from the third end of the second optical fiber line. The first intensity of the first output light is measured. Accordingly, it is possible to collectively inspect a pair of optical fiber lines. As a result, it is possible to improve inspection efficiency of the optical transmission line as compared with a configuration in which the plurality of optical fiber lines included in the optical transmission line are inspected one by one.

The measurement device may calculate a total loss which is a sum of a first optical loss in the first optical fiber line and a second optical loss in the second optical fiber line based on the first intensity, and may determine whether or not there is an abnormality in the first optical fiber line and the second optical fiber line based on the total loss. In this case, when the total loss is normal, it is possible to consider that there are no abnormalities in the first optical fiber line and the second optical fiber line. When the total loss is abnormal, it is possible to consider that there is an abnormality in the first optical fiber line and the second optical fiber line. Accordingly, since it is possible to collectively determine whether or not there is an abnormality in the first optical fiber line and the second optical fiber line, it is possible to improve the inspection efficiency of the optical transmission line.

Each of the one or plurality of connection members may be an optical cable that optically connects the second end to the fourth end. In this case, it is possible to improve the inspection efficiency of the optical transmission line with a simple configuration in which the second end and the fourth end are simply connected by the optical cable.

Each of the one or plurality of connection members may include a coupler having two inputs and two outputs. The two outputs of the coupler may be optically connected to each other. The second end and the fourth end may be optically connected to the two inputs of the coupler. In this case, the testing light incident on the first end of the first optical fiber line passes through the first optical fiber line, and is output to the connection member. In the connection member, the testing light is demultiplexed by the coupler, and the demultiplexed testing light passes through the second optical fiber line, and is output from the third end. Thus, in the aforementioned configuration, since the testing light passes through the first optical fiber line, the connection member, and the second optical fiber line in this order and is output as the first output light from the second optical fiber line, the pair of optical fiber lines can be collectively inspected, and the inspection efficiency of the optical transmission line can be improved.

The measurement device may further include a second power meter that measures second intensity which is intensity of second output light output from the first end. The second output light may be obtained by demultiplexing the testing light by the coupler. In the connection member, the testing light is demultiplexed into two demultiplexed lights by the coupler, one demultiplexed light is output to the first optical fiber line, and the other demultiplexed light is output to the second optical fiber line. One demultiplexed light is output as the second output light from the first end of the first optical fiber line. Thus, since the second intensity indicates a value corresponding to the intensity of the testing light after traveling back and forth through the first optical fiber line, the first optical fiber line can be individually inspected.

The measurement device may calculate a first optical loss in the first optical fiber line and a second optical loss in the second optical fiber line based on the first intensity and the second intensity, may determine whether or not there is an abnormality in the first optical fiber line based on the first optical loss, and may determine whether or not there is an abnormality in the second optical fiber line based on the second optical loss. In this case, since the first optical loss and the second optical loss are calculated, it is possible to individually determine whether or not there is the abnormality in the first optical fiber line and determine whether or not there is the abnormality in the second optical fiber line.

The measurement device may further include a tester that measures a temporal change of intensity of return light output from the first end. In this case, an abnormal location in the pair of optical fiber lines can be estimated depending on the temporal change of the intensity of the return light.

The measurement device further may include a first optical switch that selectively switches an optical fiber line to be optically connected to the light source among a first optical fiber line group including the first optical fiber line, and a second optical switch that selectively switches an optical fiber line to be optically connected to the first power meter among a second optical fiber line group including the second optical fiber line. In this case, it is possible to sequentially inspect the pair of optical fiber lines optically connected by the connection member by switching an optical fiber line to be optically connected to the light source and an optical fiber line to be optically connected to the first power meter.

DETAILS OF EMBODIMENT OF PRESENT DISCLOSURE

A specific example of a measurement system according to an embodiment of the present disclosure will be described below with reference to the drawings. The present disclosure is not limited to these examples, but is defined by the scope of the claims. The present disclosure is intended to include all modifications within the meanings and scope equivalent to the scope of the claims.

First Embodiment

FIG. 1 is a schematic configuration diagram of an optical transmission system to be inspected by a measurement system according to a first embodiment. An optical transmission system 1 illustrated in FIG. 1 is a system for transmitting an optical signal between two different points. In the present embodiment, the optical transmission system 1 transmits an optical signal between a location 100A and a location 100B. The locations 100A and 100B are connected by a plurality of optical cables 5.

The location 100A includes a plurality of patch panels 2A and a splice cabinet 3A. The patch panel 2A is a device for connecting devices such as a server in the location 100A to an external device so as to communicate with each other, and is housed in each stage of an optical wiring rack (rack) provided in the location 100A. A dimension of the optical wiring rack is standardized, a width and a depth of the optical wiring rack are constant, and a height is an integral multiple of 44 mm, which is "1U". The patch panel 2A includes a plurality of adapters. An optical connector provided at one end of the optical cable is inserted into each adapter. The adapters of the patch panel 2A include external adapters to which a plurality of (for example, 24) optical cables 4A are connected, and internal adapters to which a plurality of optical cables connected to the devices in the location 100A are connected.

Each of the plurality of optical cables 4A includes a plurality of (N) optical fibers. N is an integer of 2 or more, for example, 12. In the present embodiment, the optical cable 4A is a ribbon fiber (also referred to as a ribbon optical fiber) in which N optical fibers are arranged in one direction. In the following description, the N optical fibers included in the optical cable 4A may be referred to as a first optical fiber, a second optical fiber, ..., and an N-th optical fiber in order from one end in one direction. One end of the optical cable 4A is connected to the external adapter of the patch panel 2A. The other end of the optical cable 4A is connected to one end of the optical cable 5 in the splice cabinet 3A. The N optical fibers included in the optical cable 4A are connected (fusion-spliced) to any of the N optical fibers included in the optical cable 5 in a one-to-one correspondence.

The optical cable 5 includes N optical fibers. In the present embodiment, the optical cable 5 is a ribbon fiber in which N optical fibers are arranged in one direction. In the following description, the N optical fibers included in the optical cable 5 may be referred to as a first optical fiber, a second optical fiber, ..., and an N-th optical fiber in order from one end in one direction.

The location 100B includes a plurality of patch panels 2B and a splice cabinet 3B. The patch panel 2B is a device for connecting devices such as a server in the location 100B to an external device so as to communicate with each other, and is housed in each stage of an optical wiring rack (rack) provided in the location 100B. The patch panel 2B has a plurality of adapters. An optical connector provided at one end of the optical cable is inserted into each adapter. The adapters of the patch panel 2B include external adapters to which a plurality of (for example, 24) optical cables 4B are connected, and internal adapters to which a plurality of optical cables connected to the devices in the location 100B are connected.

Each of the plurality of optical cables 4B includes N optical fibers. In the present embodiment, the optical cable 4B is a ribbon fiber in which N optical fibers are arranged in one direction. In the following description, the N optical fibers included in the optical cable 4B may be referred to as a first optical fiber, a second optical fiber, ..., and an N-th optical fiber in order from one end in one direction. One end of the optical cable 4B is connected to the other end of the optical cable 5 in the splice cabinet 3B. The N optical fibers included in the optical cable 4B are fusion-spliced to any of the N optical fibers included in the optical cable 5 in a one-to-one correspondence. The other end of the optical cable 4B is connected to the external adapter of the patch panel 2B. Although the splice cabinets 3A and 3B are used in the above example, it is not always necessarily have the form of a cabinet.

As stated above, an optical transmission line R is constituted by connecting the optical cables 4A connected to the patch panels 2A, the optical cables 5, and the optical cables 4B connected to the patch panels 2B in this order. The optical cables 4A are positioned on one end side of the optical transmission line R, and the optical cables 4B are positioned on the other end side of the optical transmission line R. The optical transmission line R includes a plurality of optical fiber lines fr. The optical fiber lines fr are constituted by connecting the optical fibers included in the optical cables 4A, the optical fibers included in the optical cables 5, and the optical fibers included in the optical cables 4B in this order. That is, each optical fiber line fr extends from the internal adapter of the patch panel 2A to the internal adapter of the patch panel 2B. In the following description, the optical fiber line constituted by optically connecting a k-th optical fiber of the optical cable 4A and a k-th optical fiber of the optical cable 4B via the optical cable 5 is referred to as, a "k-th optical fiber line" (k is an integer of 1 or more and N or less).

Figure 2:
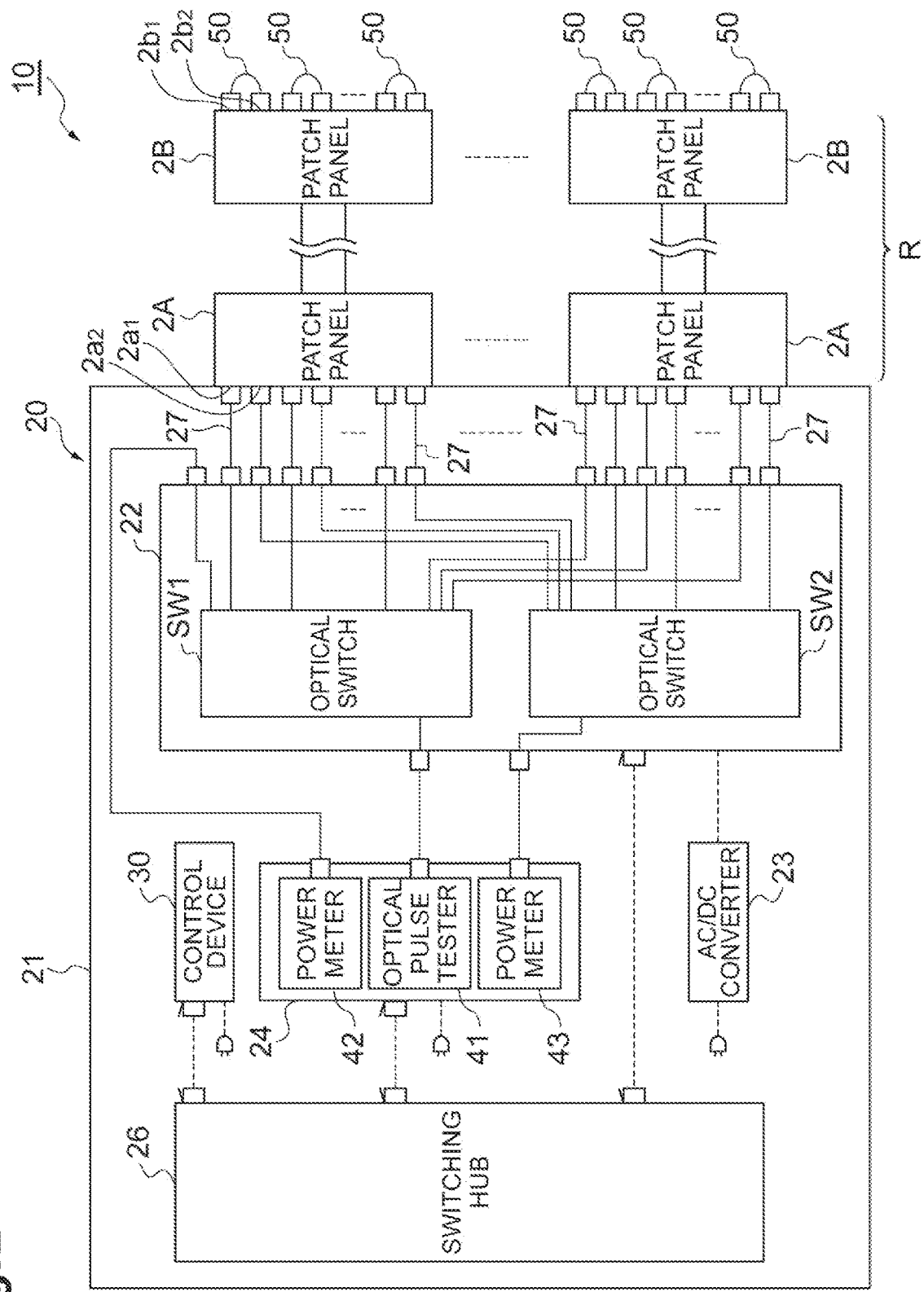
FIG. 2 is a schematic configuration diagram of the measurement system according to the first embodiment.

Next, the measurement system according to the first embodiment will be described with reference to FIG. 2. FIG. 2 is a schematic configuration diagram of the measurement system according to the first embodiment. The measurement system 10 illustrated in FIG. 2 is a system for inspecting the optical transmission line R between the location 100A and the location 100B. More specifically, the measurement system 10 inspects the optical transmission line R between the patch panels 2A and the patch panels 2B. The measurement system 10 includes a measurement device 20 and a plurality of connection members 50. The measurement device 20 inspects the plurality of optical fiber lines fr included in the optical transmission line R.

The measurement device 20 is arranged in the location 100A. That is, the measurement device 20 is arranged at one end of the optical transmission line R. The measurement device 20 includes a rack 21, an optical switch unit 22, an AC/DC converter 23, a measuring device 24, a switching hub 26, and a control device 30.

The rack 21 houses the optical switch unit 22, the AC/DC converter 23, the measuring device 24, the switching hub 26, and the control device 30. As the rack 21, for example, a rack with a caster is used to enable the measurement device 20 to be easily movable.

The optical switch unit 22 is a device that switches between light transmission paths. The optical switch unit 22 includes, for example, 1728 ports. The optical switch unit 22 includes an optical switch SW1 and an optical switch SW2. The optical switches SW1 and SW2 are driven by a DC voltage supplied from the AC/DC converter 23. The optical switches SW1 and SW2 are provided on the same substrate, for example.

An optical pulse tester 41 (light source) to be described later, a power meter 42, and a part of the internal adapters of the plurality of patch panels 2A are connected to the ports of the optical switch SW1 via optical cables. Here, among the internal adapters of the plurality of patch panels 2A, the internal adapters corresponding to the odd-numbered optical fiber lines fr (optical fiber line group G1) are connected to the ports of the optical switch SW1. The optical fiber line group G1 is a set of the odd-numbered optical fiber lines fr. The ports of the optical switch SW1 and the internal adapters of the plurality of patch panels 2A are individually connected by optical cables 27.

For example, the optical switch SW1 switches between the transmission paths such that any one internal adapter of the patch panels 2A corresponding to the optical fiber line group G1 (first optical fiber line group) or the power meter 42 is selectively connected to the optical pulse tester 41, and selectively supplies testing light output from the optical pulse tester 41 to any one adapter of the patch panels 2A or the power meter 42. That is, the optical switch SW1 selectively switches the optical fiber line fr that is optically connected to the optical pulse tester 41 among the optical fiber line group G1. The optical switch SW1 switches between the transmission paths based on a switching instruction output from the control device 30.

The power meter 43 (first power meter) to be described later and a part of the internal adapters of the plurality of patch panels 2A are connected to the ports of the optical switch SW2 via optical cables. Here, among the internal adapters of the plurality of patch panels 2A, the internal adapters corresponding to the even-numbered optical fiber lines fr (optical fiber line group G2) are connected to the ports of the optical switch SW2. The optical fiber line group G2 is a set of the even-numbered optical fiber lines fr. The ports of the optical switch SW2 and the internal adapters of the plurality of patch panels 2A are individually connected by the optical cables 27.

For example, the optical switch SW2 switches between the transmission paths such that any one internal adapter of the patch panels 2A corresponding to the optical fiber line group G2 (second optical fiber line group) is selectively connected to the power meter 43. That is, the optical switch SW2 selectively switches the optical fiber line fr that is optically connected to the power meter 43 among the optical fiber line group G2. The optical switch SW2 switches between the transmission paths based on a switching instruction output from the control device 30. The switching of the optical switches SW1 and SW2 is performed in synchronization.

The AC/DC converter 23 converts an AC voltage supplied from a commercial power supply into a DC voltage, and supplies the converted DC voltage to the optical switch unit 22. In a case where the optical switch unit 22 can be directly driven by the commercial power supply, the AC/DC converter 23 need not be provided. In a case where an AC voltage obtained by converting the AC voltage supplied from the commercial power supply is used, a voltage converter may be provided.

The measuring device 24 includes the optical pulse tester 41, the power meter 42, and the power meter 43. The optical pulse tester 41 includes a light source that outputs testing light, receives return light of the testing light output from the light source, and measures a temporal change of intensity of the return light. The return light includes backscattered light and Fresnel reflected light of the testing light. In the following description, the measurement of the temporal change of the intensity of the return light may be referred to as "OTDR measurement". A wavelength of the testing light output from the light source is, for example, 1310 nm or 1550 nm. The light source may output a plurality of testing lights having different wavelengths. For example, the light source outputs testing light having a wavelength of 1310 nm and testing light having a wavelength of 1550 nm. The optical pulse tester 41 outputs the testing light based on a light output instruction output from the control device 30. The optical pulse tester 41 performs the OTDR measurement based on a measurement instruction output from the control device 30.

The power meter 42 is a device that measures a power (intensity) of light. The power meter 42 measures the intensity of the testing light input via the optical switch SW1. The power meter 42 measures the intensity of the testing light based on a measurement instruction output from the control device 30.

The power meter 43 is a device that measures a power (intensity) of light. The power meter 43 measures the intensity of the testing light input via the optical switch SW2. The power meter 43 measures the intensity of the testing light based on a measurement instruction output from the control device 30.

The switching hub 26 is a device that connects the optical switch unit 22, the measuring device 24, and the control device 30 so as to communicate with each other by using an electric signal. The optical switch unit 22, the measuring device 24, and the control device 30 are connected to the switching hub 26 by, for example, a local area network (LAN) cable. A normal hub (a hub of a layer 1 in the Open System Interconnect (OSI) reference model) may be used instead of the switching hub 26.

The control device 30 is a controller that integrally controls the measurement system 10. For example, the control device 30 is a computer system that includes a processor such as a central processing unit (CPU), a memory such as a random access memory (RAM) and a read only memory (ROM), an input device such as a mouse and a keyboard, an output device such as a display, and a communication device such as a network card. For example, a desktop personal computer (PC), a notebook PC, and a tablet terminal can be used as the control device 30. The control device 30 inspects the optical transmission lines R by controlling the measurement system 10 based on a computer program (measurement program) stored in the memory.

Each of the plurality of connection members 50 is a member that optically connects a pair of optical fiber lines fr among the plurality of optical fiber lines fr. The connection member 50 is, for example, an optical cable including a single-core optical fiber. Specifically, the connection member 50 optically connects the two internal adapters of the patch panels 2B corresponding to the pair of optical fiber lines fr. In the present embodiment, the connection member 50 optically connects two optical fiber lines fr adjacent to each other. That is, the connection member 50 optically connects the odd-numbered optical fiber line fr and the even-numbered optical fiber line fr.

Figure 3:
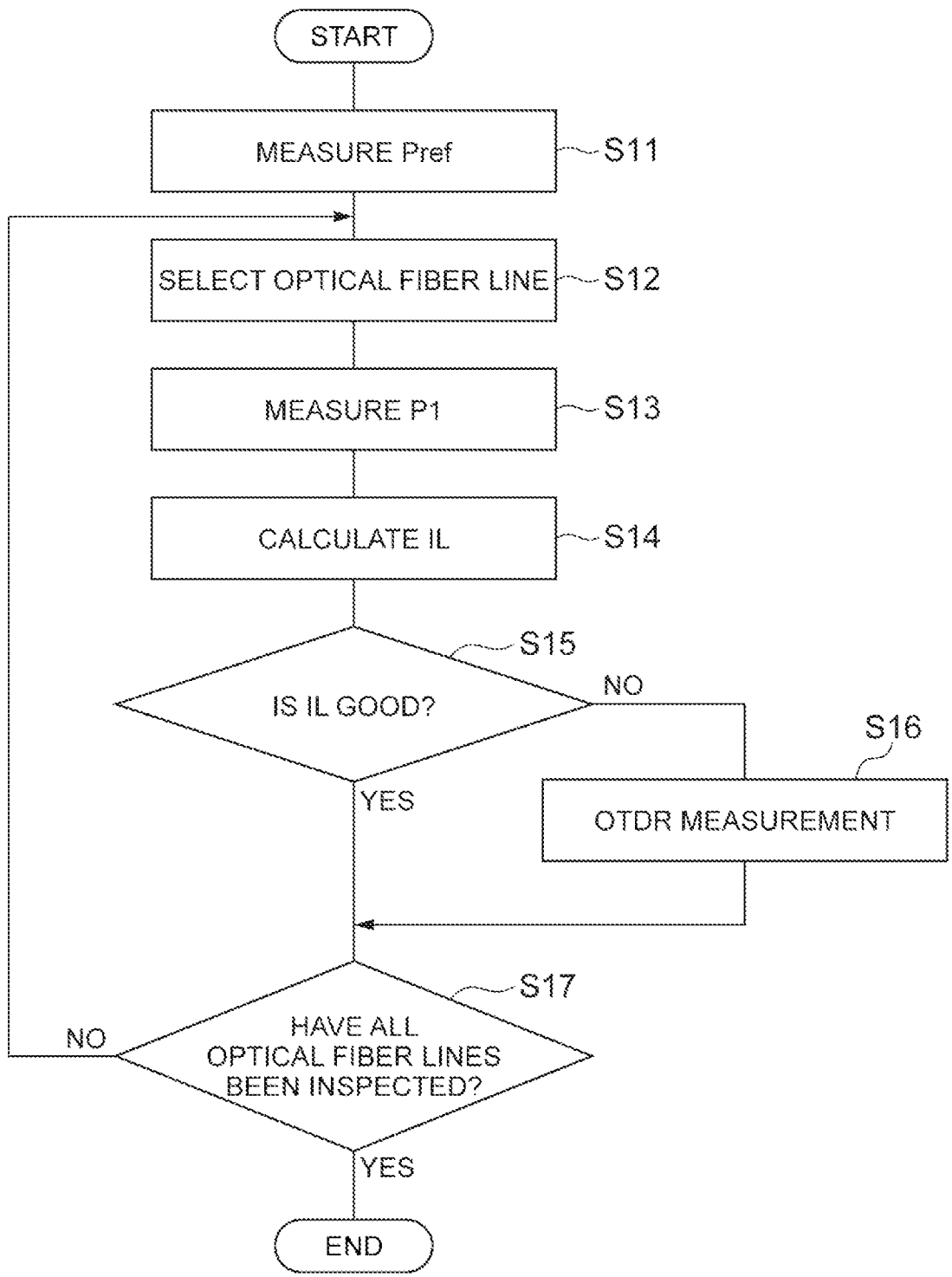
FIG. 3 is a flowchart illustrating an example of a measurement method performed by the measurement system illustrated in FIG. 2.
Figure 4:
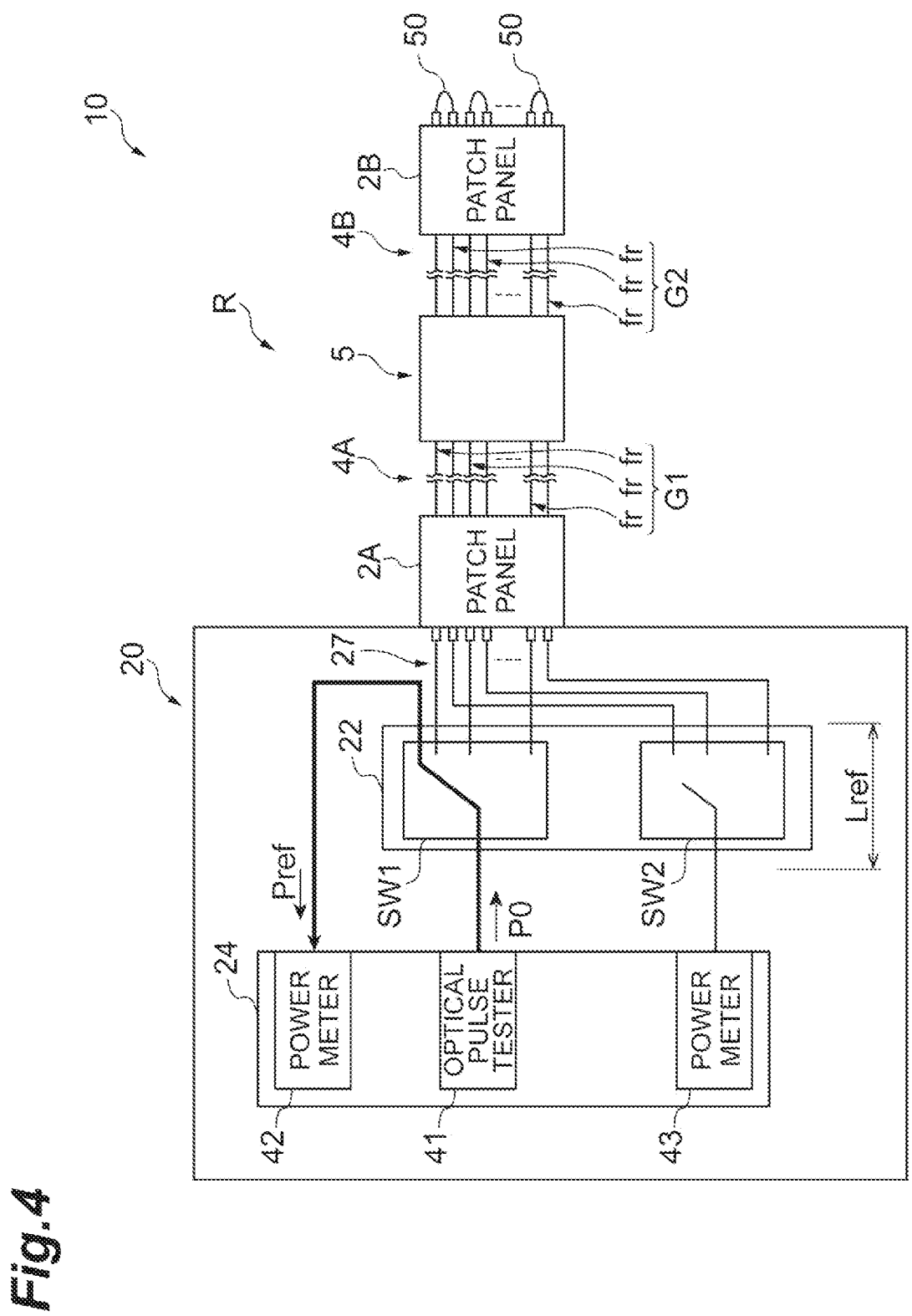
FIG. 4 is a diagram for describing a method for measuring an optical loss.
Figure 5:
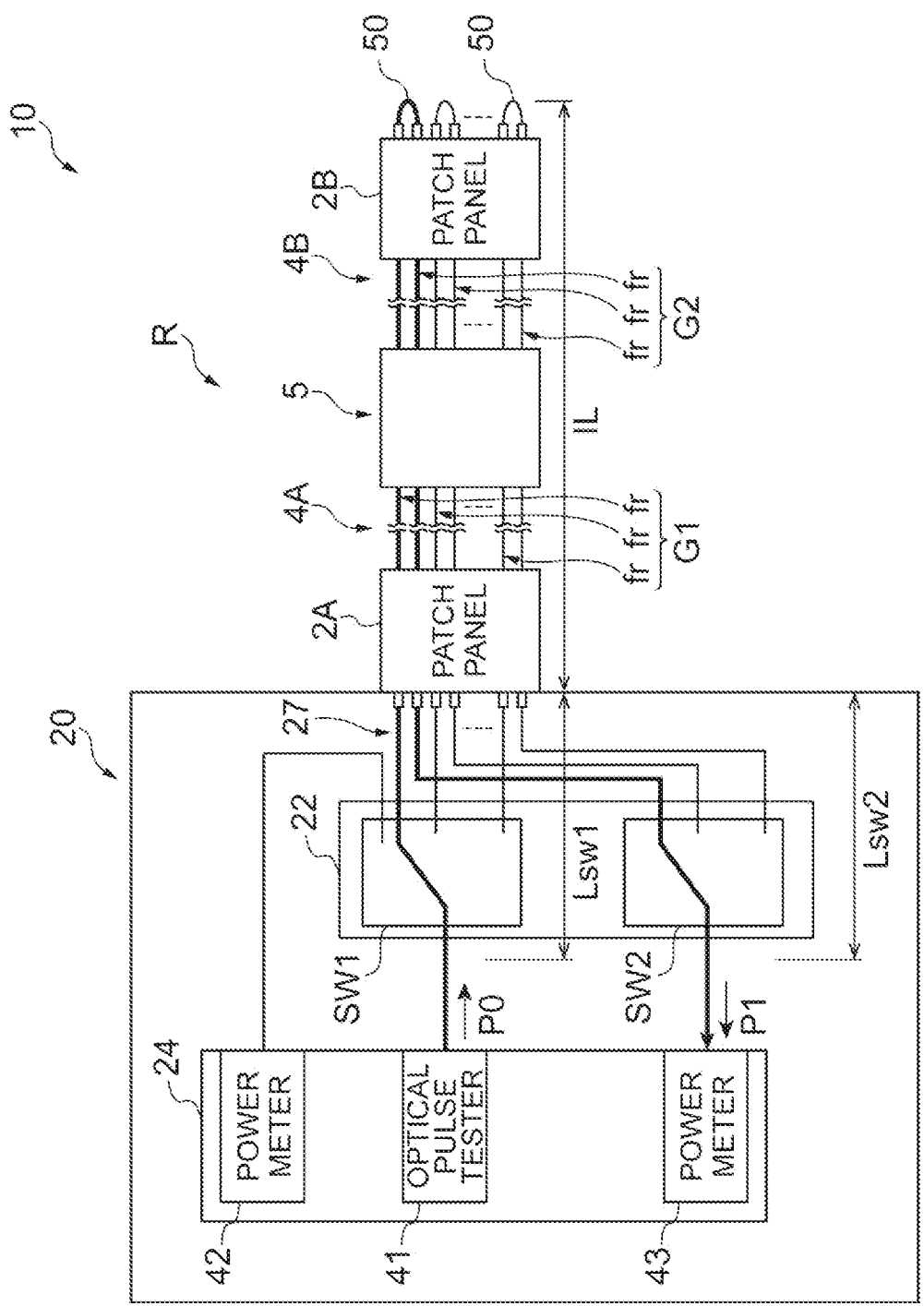
FIG. 5 is a diagram for describing the method for measuring the optical loss.
Figure 6:
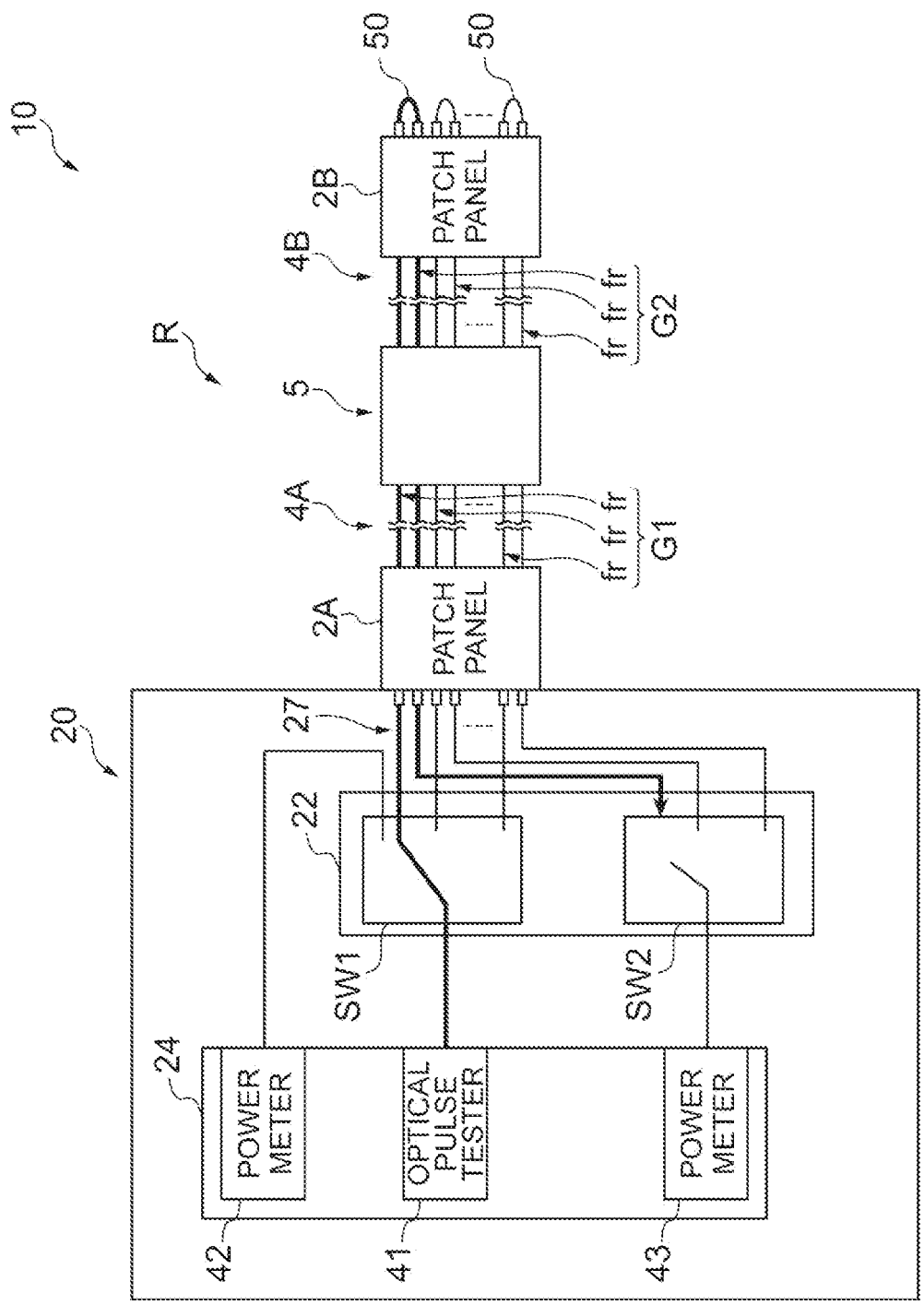
FIG. 6 is a diagram for describing a method for measuring a temporal change of intensity of return light.
Figure 7:
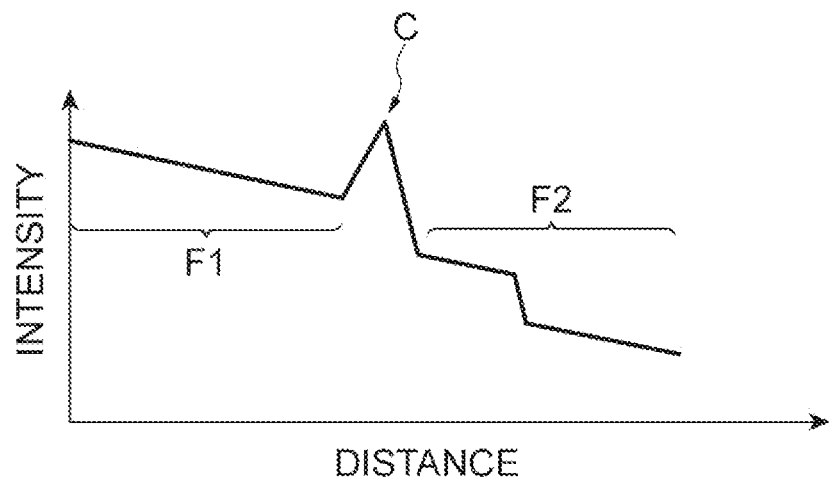
FIG. 7 is a diagram illustrating an example of a measurement result of the change with time of the intensity of the return light.

Next, a measurement method performed by the measurement system 10 will be described with reference to FIGS. 3 to 7. FIG. 3 is a flowchart illustrating an example of the measurement method performed by the measurement system illustrated in FIG. 2. FIGS. 4 and 5 are diagrams for describing a method for measuring an optical loss. FIG. 6 is a diagram for describing a method for measuring the temporal change of the intensity of the return light. FIG. 7 is a diagram illustrating an example of a measurement result of the temporal change of the intensity of the return light.

Before the inspection is performed, preparation for performing the inspection is performed. In the location 100B, two internal adapters are connected to each other by the connection member 50 for each pair of internal adapters included in the internal adapters of the plurality of patch panels 2B. A combination of the two internal adapters connected by the connection member 50 corresponds to the pair of optical fiber lines fr and is determined in advance. For example, an internal adapter $2b_1$ (second end) of the patch panel 2B positioned at the other end of the first optical fiber line fr and an internal adapter $2b2$ (fourth end) of the patch panel 2B positioned at the other end of the second optical fiber line fr are optically connected by the connection member 50.

The measurement method illustrated in FIG. 3 is started by executing the measurement program in the control device 30, for example. First, the measurement device 20 measures a power Pref (step S11). Specifically, as illustrated in FIG. 4, the control device 30 transmits the switching instruction to the optical switch SW1 such that the port to which the optical pulse tester 41 is connected and the port to which the power meter 42 is connected are optically connected in the optical switch SW1. The control device 30 causes the optical pulse tester 41 to output the testing light, and causes the power meter 42 to measure the power Pref. The control device 30 receives the power Pref measured by the power meter 42, and stores the power Pref in a memory (not illustrated).

Subsequently, the measurement device 20 selects the pair of optical fiber lines fr to be inspected (step S12). For example, the measurement device 20 selects a set of the first optical fiber line fr (first optical fiber line) and the second optical fiber line fr (second optical fiber line). In this case, as illustrated in FIG. 5, the control device 30 transmits the switching instruction to the optical switch SW1 such that the port to which the optical pulse tester 41 is connected and the port connected to the first optical fiber of the optical cable 4A are optically connected in the optical switch SW1. The control device 30 transmits the switching instruction to the optical switch SW2 such that the port to which the power meter 43 is connected and the port connected to the second optical fiber of the optical cable 4A are optically connected in the optical switch SW2. Accordingly, the optical pulse tester 41 and an internal adapter $2a_1$ (first end) of the patch panel 2A positioned at one end of the first optical fiber line fr are optically connected, and the power meter 43 and an internal adapter $2a_2$ (third end) of the patch panel 2A positioned at one end of the second optical fiber line fr are optically connected.

Since the optical cable 4A is not directly connected to the optical switch SW1, the port connected to the first optical fiber of the optical cable 4A means the port optically connected to the first optical fiber via the optical cable 27 and the patch panel 2A. Similarly, since the optical cable 4A is not directly connected to the optical switch SW2, the port connected to the second optical fiber of the optical cable 4A means the port optically connected to the second optical fiber via the optical cable 27 and the patch panel 2A. Similar expressions are used in the following description.

Subsequently, the measurement device 20 measures a power P1 (step S13). Specifically, the control device 30 causes the optical pulse tester 41 to output the testing light, and causes the power meter 43 to measure the power P1. When the set of the first optical fiber line fr and the second optical fiber line fr is selected, the optical pulse tester 41 causes the testing light to be incident on the internal adapter $2a_1$ via the optical switch SW1 and the optical cable 27. The testing light incident on the internal adapter $2a_1$ passes through the first optical fiber line fr, the connection member 50, and the second optical fiber line fr in this order, and is output from the internal adapter $2a_2$. The power meter 43 receives the testing light (first output light) output from the internal adapter $2a_2$ via the optical cable 27 and the optical switch SW2, and measures the intensity (first intensity) of the testing light as the power P1. The control device 30 receives the power P1 measured by the power meter 43.

Subsequently, the control device 30 calculates an optical loss IL based on the power P1 (step S14). The optical loss IL is a total loss of an optical loss IL1 in one optical fiber line fr and an optical loss IL2 in the other optical fiber line fr, of the pair of optical fiber lines fr. Specifically, the control device 30 calculates the optical loss IL by using Expression (1) based on the power Pref and the power P1. The optical loss IL includes losses (for example, connection losses of the patch panels 2B and the connection members 50) in the patch panels 2A and 2B and the connection member 50. An optical loss Lref is a loss in the optical switch SW1. An optical loss Lsw1 is losses in the optical switch SW1 and the optical cable 27. An optical loss Lsw2 is losses in the optical switch SW2 and the optical cable 27. The optical loss Lref, the optical loss Lsw1, and the optical loss Lsw2 are measured in advance, and are stored in the memory of the control device 30.

[Expression 1]

$$IL=IL1+IL2=Pref+Lref-P1-Lsw1-Lsw2 \quad (1)$$

The testing light output from the optical pulse tester 41 propagates through the optical switch SW1, one optical fiber line fr, the connection member 50, the other optical fiber line fr, and the optical switch SW2 in this order. Thus, a power P0 of the testing light output from the optical pulse tester 41 is equal to a power obtained by adding each optical loss in the light transmission path to the power P1. Since the power P0 cannot be directly measured, a value obtained by adding the optical loss Lref to the power Pref is calculated as the power P0. A power obtained by subtracting the optical loss Lsw1, the optical loss Lsw2, and the power P1 from the power P0 is calculated as the optical loss IL. The control device 30 stores an identification number of the optical fiber line fr, the power P1, and the optical loss IL in association with each other in a memory (not illustrated).

Subsequently, the control device 30 reads the optical loss IL from the memory, and determines whether or not the optical loss IL is good (step S15). That is, the control device 30 determines whether or not there is an abnormality in the pair of optical fiber lines fr based on the optical loss IL. Specifically, the control device 30 compares the optical loss IL with a predetermined determination threshold value. When the optical loss IL is less than or equal to the determination threshold value, the control device 30 determines that the optical loss IL is good, that is, the pair of optical fiber lines fr are normal (step S15, YES), and performs step S17. Meanwhile, when the optical loss IL is larger than the determination threshold value, the control device 30 determines that the optical loss IL is abnormal (step S15, NO), and causes the measurement device 20 to perform the OTDR measurement (step S16).

When the set of the first optical fiber line fr and the second optical fiber line fr is selected, as illustrated in FIG. 6, the control device 30 transmits the switching instruction to the optical switch SW1 such that the port to which the optical pulse tester 41 is connected and the port connected to the first optical fiber of the optical cable 4A are optically connected in the optical switch SW1. The control device 30 transmits the switching instruction to the optical switch SW2 such that the port connected to the second optical fiber of the optical cable 4A is not optically connected to any other port in the optical switch SW2. Accordingly, the optical pulse tester 41 and the internal adapter $2a_1$ are optically connected, and any internal adapter is not optically connected to the power meter 43.

The control device 30 causes the optical pulse tester 41 to output the testing light, and causes the optical pulse tester 41 to measure the temporal change of the intensity of the return light. That is, the optical pulse tester 41 causes the testing light to be incident on the internal adapter $2a_1$ via the optical switch SW1 and the optical cable 27. When the testing light incident on the internal adapter $2a_1$ sequentially propagates through the first optical fiber line fr, the connection member 50, and the second optical fiber line fr, the return light returns to the internal adapter $2a_1$ due to backscattering and reflection. The optical pulse tester 41 receives the return light output from the internal adapter $2a_1$ via the optical cable 27 and the optical switch SW1, and measures the temporal change of the intensity of the return light. The control device 30 receives a measurement result measured by the optical pulse tester 41, and stores the received measurement result together with the identification number of the optical fiber line fr in a memory (not illustrated). The control device 30 performs step S17.

A method for estimating an abnormal location will be described by using an example of the measurement result illustrated in FIG. 7. A horizontal axis of FIG. 7 indicates a distance from the optical pulse tester 41, and a vertical axis of FIG. 7 indicates the intensity of the return light. This measurement result includes a first portion F1, a protruding portion C, and a second portion F2. The first portion F1 indicates the intensity of the return light (backscattered light) in the first optical fiber line fr. In the first portion F1, the intensity of the return light gradually decreases as the distance from the optical pulse tester 41 increases. The protruding portion C indicates the intensity of the return light in the connection member 50. Since the reflection occurs in the connection member 50, the intensity of the return light in the connection member 50 becomes higher than the intensity of the return light in the optical fiber line fr. The second portion F2 indicates the intensity of the return light (backscattered light) in the second optical fiber line fr. In the second portion F2, the intensity of the return light decreases sharply. That is, it is possible to estimate that an abnormality such as breakage occurs in the middle of the second optical fiber line fr. In the measurement result illustrated in FIG. 7, near-end reflection, reflections occurring in the patch panels 2A and 2B, reflections occurring in the optical switch SW1 and the like are omitted.

Subsequently, the control device 30 determines whether or not all the optical fiber lines fr have been inspected (step S17). When it is determined that not all of the optical fiber lines fr have been inspected (step S17, NO), the control device 30 selects a pair of uninspected optical fiber lines fr (step S12). The control device 30 re-performs the processing of steps S13 to S17. Meanwhile, in step S17, when the control device 30 determines that all the optical fiber lines fr have been inspected (step S17, YES), the series of processing of the measurement method performed by the measurement system 10 ends.

As described above, in the measurement system 10, the other ends of the pair of optical fiber lines fr are optically connected by the connection member 50, and the testing light is incident on one end of the one optical fiber line fr. Thus, the testing light passes through one optical fiber line fr, the connection member 50, and the other optical fiber line fr in this order, and is output from one end of the other optical fiber line fr. Accordingly, the power P1 is measured. Accordingly, the pair of optical fiber lines fr can be collectively inspected. As a result, it is possible to improve inspection efficiency of the optical transmission line R as compared with a configuration in which the plurality of optical fiber lines fr included in the optical transmission line R are inspected one by one.

Specifically, the measurement system 10 calculates the optical loss IL which is the sum of the optical loss IL1 in the one optical fiber line fr and the optical loss IL2 in the other optical fiber line fr based on the power P1. When the optical loss IL is normal, it is possible to consider that there are no abnormalities in the pair of optical fiber lines fr. When the optical loss IL is abnormal, it is possible to consider that the pair of optical fiber lines fr are abnormal. Accordingly, it is possible to collectively determine whether or not there is an abnormality in the pair of optical fiber lines fr, so that it is possible to improve the inspection efficiency of the optical transmission line R.

The measurement system 10 can improve the inspection efficiency of the optical transmission line R with a simple configuration in which the other end of the one optical fiber line fr and the other end of the other optical fiber line fr are simply connected by the connection member 50 (optical cable).

The optical pulse tester 41 measures the temporal change of the intensity of the return light output from one end of the one optical fiber line fr. An abnormal location in the pair of optical fiber lines can be estimated by the temporal change of the intensity of the return light.

The optical pulse tester 41 and one optical fiber line fr of each pair of the optical fiber lines fr are connected to the optical switch SW1, and the optical fiber line fr optically connected to the optical pulse tester 41 is switched. The power meter 43 and the other optical fiber line fr of each pair of the optical fiber lines fr are connected to the optical switch SW2, and the optical fiber line fr optically connected to the power meter 43 is switched. Accordingly, it is possible to sequentially inspect the pair of optical fiber lines fr to be optically connected by the connection member 50.

Second Embodiment

Figure 8:
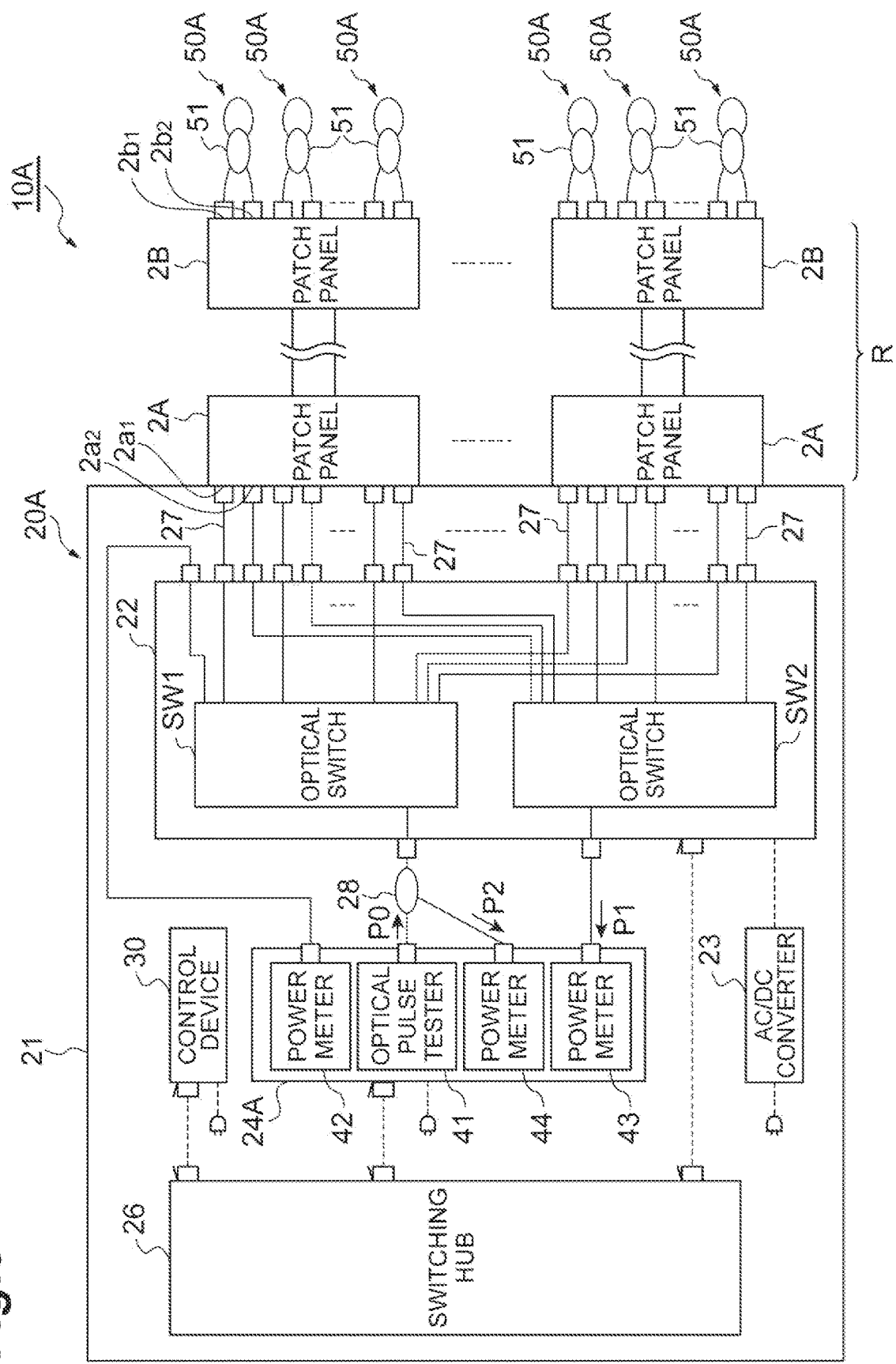
FIG. 8 is a schematic configuration diagram of a measurement system according to a second embodiment.

Next, a measurement system according to a second embodiment will be described with reference to FIG. 8. FIG. 8 is a schematic configuration diagram of the measurement system according to the second embodiment. A measurement system 10A illustrated in FIG. 8 is mainly different from the measurement system 10 in that the measurement system 10A includes a measurement device 20A instead of the measurement device 20 and a plurality of connection members 50A instead of the plurality of connection members 50. The measurement device 20A is mainly different from the measurement device 20 in that the measurement device 20A includes a measuring device 24A instead of the measuring device 24 and that the measurement device 20A further includes a coupler 28.

The measuring device 24A is mainly different from the measuring device 24 in that the measuring device 24A further includes a power meter 44. The power meter 44 is a device that measures a power (intensity) of light. The power meter 44 measures intensity of demultiplexed light input via the optical switch SW1. The power meter 44 measures the intensity of the demultiplexed light based on a measurement instruction output from the control device 30.

The coupler 28 is an optical multiplexer and demultiplexer. For example, a 3-dB coupler is used as the coupler 28. The coupler 28 is provided between the optical switch SW1 and the measuring device 24A. The optical pulse tester 41 and the power meter 44 are connected to the optical switch SW1 via the coupler 28. The coupler 28 outputs the testing light output from the optical pulse tester 41 to the optical switch SW1. The coupler 28 demultiplexes the light output from the optical switch SW1, and outputs demultiplexed lights to the optical pulse tester 41 and the power meter 44, respectively.

The connection member 50A is mainly different from the connection member 50 in that the connection member 50A includes a coupler 51 instead of the optical cable. The coupler 51 is a 2×2 (2 inputs and 2 outputs) optical multiplexer and demultiplexer. For example, a 3-dB coupler is used as the coupler 51. Specifically, the internal adapters of the patch panel 2B corresponding to the pair of optical fiber lines fr are optically connected to two input ports of the coupler 51, respectively. In the present embodiment, two optical fiber lines fr adjacent to each other are optically connected to the coupler 51.

The odd-numbered optical fiber line fr is optically connected to one input port of the coupler 51, and the even-numbered optical fiber line fr is optically connected to the other input port of the coupler 51. For example, the internal adapter $2b_1$ of the patch panel 2B positioned at the other end of the first optical fiber line fr is optically connected to one input port of the coupler 51 by an optical cable or the like, and the internal adapter $2b_2$ of the patch panel 2B positioned at the other end of the second optical fiber line fr is optically connected to the other input port of the coupler 51 by an optical cable or the like. Two output ports of the coupler 51 are optically connected to each other by an optical cable or the like.

A measurement method performed by the measurement system 10A is mainly different from the measurement system 10 in steps S13 to S15. In step S13, the measurement device 20A measures the power P1 in the same manner as the measurement device 20 and measures the power P2. Specifically, the control device 30 causes the optical pulse tester 41 to output testing light, causes the power meter 43 to measure the power P1, and causes the power meter 44 to measure the power P2. When the set of the first optical fiber line fr and the second optical fiber line fr is inspected, the optical pulse tester 41 causes the testing light to be incident on the internal adapter $2a_1$ via the coupler 28, the optical switch SW1, and the optical cable 27. The testing light incident on the internal adapter $2a_1$ passes through the first optical fiber line fr, and is output to the connection member 50A.

In the connection member 50A, the testing light is demultiplexed by the coupler 51, one demultiplexed light is output to the first optical fiber line fr, and the other demultiplexed light is output to the second optical fiber line fr. One demultiplexed light passes through the first optical fiber line fr, and is output from the internal adapter $2a_1$. The other demultiplexed light passes through the second optical fiber line fr, and is output from the internal adapter $2a_2$. The power meter 44 receives one demultiplexed light output from the internal adapter $2a_1$ via the optical cable 27, the optical switch SW1, and the coupler 28, and measures the intensity of the demultiplexed light as the power P2. The power meter 43 receives the other demultiplexed light output from the internal adapter $2a_2$ via the optical cable 27 and the optical switch SW2, and measures the intensity of the demultiplexed light as the power P1. The control device 30 receives the power P1 measured by the power meter 43 and the power P2 measured by the power meter 44.

Subsequently, in step S14, the control device 30 calculates the optical loss IL1 and the optical loss IL2 based on the power P1 and the power P2. Specifically, the control device 30 obtains a relational expression of Expression (2) based on the power Pref and the power P1.
[Expression 2]

$$IL1+2\times IL2=Pref+Lref-2\times P1-Lsw1-2\times Ls2 \quad (2)$$

The control device 30 calculates the optical loss IL1 by using Expression (3) based on the power Pref and the power P2. It is assumed that the coupler 28 and the coupler 51 are the 3-dB couplers, and the optical power of the testing light is demultiplexed at a ratio of one to one in each coupler. A value obtained by adding the optical loss Lref to the power Pref corresponds to half the power P0 of the testing light output from the optical pulse tester 41.

[Expression 3]

$$IL1 = \frac{1}{3}(Pref + Lref - 4\times P2 - 3\times Lsw1) \quad (3)$$

The control device 30 calculates the optical loss IL2 from Expressions (2) and (3). The control device 30 stores the identification number of the optical fiber line fr, the power P1, the power P2, the optical loss ILL and the optical loss IL2 in association with each other in a memory (not illustrated).

Subsequently, in step S15, the control device 30 reads the optical loss IL1 and the optical loss IL2 from the memory, and determines whether or not the optical loss IL1 and the optical loss IL2 are good. That is, the control device 30 determines whether or not there is an abnormality in one optical fiber line fr based on the optical loss Ill, and determines whether or not there is an abnormality in the other optical fiber line fr based on the optical loss IL2. Specifically, the control device 30 compares the optical loss IL1 with the determination threshold value, and also compares the optical loss IL2 with the determination threshold value. When the optical loss IL1 is equal to or less than the determination threshold value, the control device 30 determines that the optical loss IL1 is good, that is, one optical fiber line fr is normal. When the optical loss IL1 is larger than the determination threshold value, the control device 30 determines that the optical loss IL1 is abnormal, that is, one optical fiber line fr is abnormal. Similarly, when the optical loss IL2 is equal to or less than the determination threshold value, the control device 30 determines that the optical loss IL2 is good, that is, the other optical fiber line fr is normal. When the optical loss IL2 is larger than the determination threshold value, the control device 30 determines that the optical loss IL2 is abnormal, that is, the other optical fiber line fr is abnormal.

When both the optical loss IL1 and the optical loss IL2 are good, the control device 30 performs step S17. Meanwhile, when at least one of the optical loss IL1 and the optical loss IL2 is abnormal, the control device 30 causes the measurement device 20 to perform the OTDR measurement (step S16).

As described above, in the measurement system 10A, the same effects as those of the measurement system 10 can also be obtained. In the measurement system 10A, the testing light incident on one end of one optical fiber line fr of the pair of optical fiber lines fr passes through the one optical fiber line, and is output to the connection member 50A. In the connection member 50A, the testing light is demultiplexed into two demultiplexed lights by the coupler 51, one demultiplexed light is output to one optical fiber line fr, and the other demultiplexed light is output to the other optical fiber line fr. The other demultiplexed light passes through the other optical fiber line fr, and is output from one end of the other optical fiber line fr. Thus, in the measurement system 10A, since the testing light passes through the one optical fiber line fr, the connection member 50A, and the other optical fiber line fr in this order, and is output from the other optical fiber line fr, the pair of optical fiber lines can be collectively inspected, and the inspection efficiency of the optical transmission line can be improved. The one demultiplexed light is output from one end of the one optical fiber line fr. Thus, since the power P2 indicates a value corresponding to the intensity of the testing light after traveling back and forth on one optical fiber line fr, it is possible to individually inspect one optical fiber line fr.

Specifically, in the measurement system 10A, the optical loss IL1 in the one optical fiber line fr and the optical loss IL2 in the other optical fiber line fr are calculated based on the power P1 and the power P2. It is determined whether or not there is an abnormality in one optical fiber line fr based on the optical loss ILL and it is determined whether or not there is an abnormality in the other optical fiber line fr based on the optical loss IL2. As stated above, the measurement system 10A can individually determine whether or not there is an abnormality in one optical fiber line fr and whether or not there is an abnormality in the other optical fiber line fr.

The measurement system according to the present disclosure is not limited to the aforementioned embodiment.

For example, although it has been described in the aforementioned embodiment that the optical cable 4A and the optical cable 4B are optically connected by one optical cable 5 in the optical transmission line R, but may be optically connected by the plurality of optical cables 5 connected in series.

The optical cables 4A, 4B, and 5 may be cables including a plurality of (N) optical fibers, and may not be ribbon fibers. The optical cables 4A, 4B, and 5 may include optical fiber strands instead of the optical fibers.

Although it has been described in the aforementioned embodiment that the optical pulse tester 41 includes the light source, the optical pulse tester 41 and the light source may be separately provided. Alternatively, the measuring device 24 may include a light source different from the light source included in the optical pulse tester 41 in order to measure a power.

It has been described in the aforementioned embodiment that the measurement system 10 or 10A automatically inspects the optical transmission line R under the control of the control device 30 by executing the measurement program. However, an operator designates the optical fiber line fr to be inspected by using the input device of the control device 30, and thus, the measurement system 10 or 10A may perform the inspection.

Each of the measurement of the optical loss IL and the OTDR measurement may be performed by using a plurality of testing lights having different wavelengths. In this case, inspection accuracy can be further improved.

The OTDR measurement of step S16 may be omitted. In this case, an inspection time can be shortened.

In the measurement systems 10 or 10A, the operator can set and change the threshold values, the pulse width of the testing light, the OTDR measurement conditions, and the range of the measurement distance or the like by using the input device of the control device 30. For example, in the OTDR measurement, a resolution may be improved by reducing the pulse width depending on the situation. Accordingly, the inspection accuracy can be improved.

REFERENCE SIGNS LIST

1 Optical transmission system
2A Patch panel
2B Patch panel
$2a_1$ Internal adapter (first end)
$2a_2$ Internal adapter (third end)
$2b_1$ Internal adapter (second end)
$2b_2$ Internal adapter (fourth end)
10, 10A Measurement system
20, 20A Measurement device
24, 24A Measuring device
28 Coupler
30 Control device
41 Optical pulse tester (light source, tester)
43 Power meter (first power meter)
44 Power meter (second power meter)
50, 50A Connection member
51 Coupler
fr Optical fiber line
G1 Optical fiber line group (first optical fiber line group)
G2 Optical fiber line group (second optical fiber line group)
R Optical transmission line
SW1 Optical switch (first optical switch)
SW2 Optical switch (second optical switch).

The invention claimed is:

1. A measurement system that inspects an optical transmission line including a plurality of optical fiber lines, the system comprising:
a measurement device including a light source configured to output testing light, and a first power meter configured to measure intensity of light; and
one or a plurality of connection members each configured to optically connect a pair of optical fiber lines of the plurality of optical fiber lines,
wherein a first optical fiber line of the pair of optical fiber lines includes a first end and a second end opposite to the first end,
a second optical fiber line of the pair of optical fiber lines includes a third end and a fourth end opposite to the third end,
the one or plurality of connection members optically connect the second end to the fourth end,
the light source causes the testing light to be incident on the first end,
the first power meter measures first intensity which is intensity of first output light output from the third end by causing the testing light to propagate through the pair of optical fiber lines,
each of the one or plurality of connection members includes a coupler having two inputs and two outputs,
the two outputs of the coupler are optically connected to each other, and
the second end and the fourth end are optically connected to the two inputs of the coupler,
the measurement device further includes a second power meter configured to measure second intensity which is intensity of second output light output from the first end, and
the second output light is obtained by demultiplexing the testing light by the coupler.

2. The measurement system according to claim 1, wherein the measurement device calculates a total loss which is a sum of a first optical loss in the first optical fiber line and a second optical loss in the second optical fiber line based on the first intensity, and determines whether or not there is an abnormality in the first optical fiber line and the second optical fiber line based on the total loss.

3. The measurement system according to claim 1, wherein the measurement device calculates a first optical loss in the first optical fiber line and a second optical loss in the second optical fiber line based on the first intensity and the second intensity, determines whether or not there is an abnormality in the first optical fiber line based on the first optical loss, and determines whether or not there is an abnormality in the second optical fiber line based on the second optical loss.

4. The measurement system according to claim 1, wherein the measurement device further includes a tester configured to measure a temporal change of intensity of return light output from the first end.

5. The measurement system according to claim 1,
wherein the measurement device further includes
a first optical switch configured to selectively switch an optical fiber line to be optically connected to the light source among a first optical fiber line group including the first optical fiber line, and
a second optical switch configured to selectively switch an optical fiber line to be optically connected to the first power meter among a second optical fiber line group including the second optical fiber line.

6. The measurement system according to claim 1,
wherein the coupler demultiplexes the testing light which has passed through the first optical fiber line into a first demultiplexed light and a second demultiplexed light, and outputs the first demultiplexed light to the first optical fiber line to be outputted as the second output light from the first end and outputs the second demultiplexed light to the second optical fiber line to be outputted as the first output light from the third end.

7. The measurement system according to claim 1, wherein the coupler is a 3-dB coupler which demultiplexes optical power of the testing light at a ratio of one to one.

8. A measurement system that inspects an optical transmission line including a plurality of optical fiber lines, the system comprising:

a measurement device including a light source configured to output testing light, and a first power meter and a second power meter each configured to measure intensity of light, wherein a pair of optical fiber lines among the plurality of optical fiber lines is optically connected to each other via a coupler at one end, a first optical fiber line of the pair of optical fiber lines includes a first end and a second end opposite to the first end, the second end corresponding to the one end at which the coupler is provided, a second optical fiber line of the pair of optical fiber lines includes a third end and a fourth end opposite to the third end, the third end corresponding to the one end at which the coupler is provided, the light source causes the testing light to be incident on the first end, the first power meter measures first intensity which is intensity of first output light output from the third end by causing the testing light to propagate through the pair of optical fiber lines, the second power meter measures second intensity which is intensity of second output light output from the first end, and the second output light is obtained by demultiplexing the testing light that has propagated through the first optical fiber line from the first end, by the coupler.

* * * * *